Patented Oct. 16, 1928.

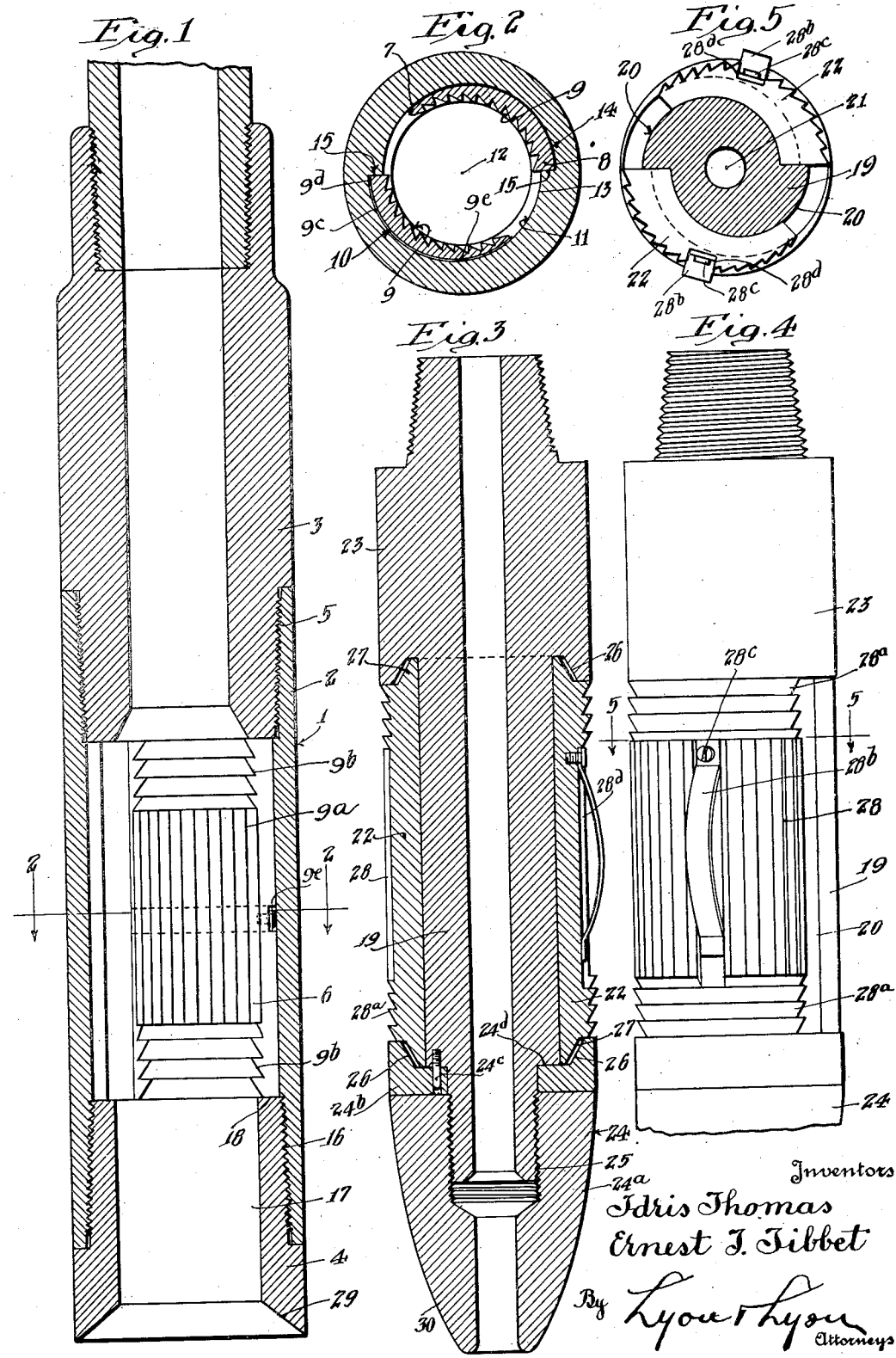

1,687,808

UNITED STATES PATENT OFFICE.

IDRIS THOMAS, OF WHITTIER, AND ERNEST I. TIBBET, OF HUNTINGTON PARK, CALIFORNIA.

FISHING TOOL.

Application filed May 2, 1927. Serial No. 188,273.

This invention relates to fishing tools such as are used in the drilling of deep wells, to recover "lost" objects such as drilling tools or twisted off drill collars, etc.

The general object of the invention is to provide a fishing tool of similar construction which can be readily applied to the "lost" object or article by a longitudinal movement and which, upon the sudden rotary movement of the body of the fishing tool, will actuate the slips to cause the same to grip the lost article.

The invention may be applied to "inside" or "outside" fishing tools.

Further objects of the invention will appear hereinafter.

The invention consists in the novel parts and combination of parts to be described hereinafter, all of which contribute to produce an efficient fishing tool.

A preferred embodiment of the invention is described in the following specification, while the broad scope of the invention is pointed out in the appended claims.

In the drawing:

Figure 1 is a section through a fishing tool embodying my invention as adapted to an outside fishing tool.

Figure 2 is a cross-section through this fishing tool taken about on the line 2—2 of Figure 1.

Figure 3 is a longitudinal section through a fishing tool embodying the invention as adapted to an inside fishing tool.

Figure 4 is a side elevation of the fishing tool shown in Figure 3, the lower portion of the same being broken away.

Figure 5 is a cross-section taken about on the line 5—5 of Figure 4.

In practicing the invention we provide an elongated retaining member for carrying the jaws or gripping slips that grip the object or article which is to be recovered from the well; this retaining member has curved eccentric faces which are eccentric to its longitudinal axis. Slips of arcuate form are carried by the retaining member and they have curved faces on one side to cooperate with the curved faces of the retaining member, with teeth on their opposite sides to grip the article. The construction is such that after the fishing tool has been slipped over or into the lost article, a sudden rotation of the retaining member will cause a relative movement of the slips along the eccentric curved faces and thereby cause the slips to move and grip the "lost" object. In the case of an outside fishing tool, the slips, of course, would approach each other. In the case of an inside gripping fishing tool, of course, the slips would move outwardly to grip the inside wall of the tubular object, such as twisted off drill pipe.

In Figures 1 and 2 we illustrate an embodiment of the invention adapted to an outside fishing tool. This tool consists of a retaining member 1 which may include a body 2 of tubular form, an upper head 3 and a lower head 4. At least one of these heads should be removable from the body. In the present instance both of the heads are provided with tapered screw threads 5 for enabling them to be detached from the body. These heads retain the slips 6 within the body. The slips 6 are of arcuate form (see Figure 2), and furthermore they are tapered in a circumferential direction; that is to say, as viewed in cross-section they are of less width at the ends 7 than at the ends 8. On the side of the slips which is toward the tool, for example, in the present instance on the inner side, each slip is provided with teeth or wickers 9 to engage the "lost" article. On the outer sides, or the side away from the "lost" article, each slip is provided with a curved face 10. These curved faces lie against correspondingly curved faces 11. These faces 11, however, are eccentric to the longitudinal axis 12 of the fishing tool; in other words, referring to Figure 2, the portions 13 of these curved faces are nearer to the axis 12 than the portions 14. With this organization of parts, it is evident that if the retaining member of the fishing tool is given a sudden rotation on its longitudinal axis, the eccentric faces 11 of the retaining member will cause the slips to approach each other and grip the article which they surround. In the normal position of the slips, the butt ends, or large ends of the slips, with respect to their circumferential taper, rest against shoulders 15, which extend longitudinally along the inner face of the body 2.

In the present instance, where there are two slips employed, these shoulders 15 would be diametrically opposite to each other. However, we do not limit ourselves to any particular number of slips, and, if desired, three or more slips may be employed, in which case the circumference of the tool would be divided into three sections, each section corresponding to its particular slip.

The lower head 4 is preferably provided with a tapered thread 16 which enables it to be readily detachable. The bore 17 through this head is small enough to insure the formation of a projecting shoulder 18 to support the lower ends of the slips.

The teeth or wickers 9 on the gripping face of the slips are preferably formed in two zones, of different character, that is to say, we prefer to provide a zone 9ª in which the teeth extend longitudinally of the fishing tool, and at each end we provide zones 9ᵇ in which each tooth is disposed circumferentially and is formed so as to grip an article in such a way as to facilitate its being raised.

In adapting the invention to the construction of an "inside" fishing tool, the same principle of construction is employed, but in this case the body 19 of the fishing tool is in the form of a mandrel instead of being tubular, as in Figure 1, and this mandrel is formed with two eccentric curved faces 20 which are eccentric to the longitudinal axis 21 of the tool. The slips 22 are of arcuate form and taper circumferentially, as in the other embodiment of the invention. In this embodiment of the invention the slips are retained between two heads, namely, an upper head 23 which, if desired, may be made integral with the mandrel 19 (see Figure 3), and a lower head 24 which may be detachably connected to the mandrel by means of screw threads 25. The heads perform their function of retaining the slips by means of annular grooves 26 which are formed in the adjacent ends of the heads. These annular grooves receive tapered tips 27 which project into them from the ends of the slips. There should, of course, be enough play between the tips 27 and the faces of the grooves 26 to permit the slips to move in and out when acted upon by the eccentric faces 20.

The outer faces of these slips are provided with longitudinal teeth 28 and circumferential teeth 28ª, which operate to grip the inner side of the "lost" bit or tubing in the same way that the corresponding teeth operate to grip a "lost" article over which the outside fishing tool may be slipped.

In the case of the outside fishing tool shown in Figure 1, the lower end of the head 4 is formed with a tapered mouth 29 which enables this head to constitute a shoe to facilitate its being passed down over the article or object to be recovered.

In the case of the "inside" fishing tool the lower head 24 is tapered to form a nose 30, so that this head operates as a spear head to pass down into a piece of tubing to be recovered.

The slips operate more satisfactorily if a spring is used with each slip. This is particularly true of the "inside" tool as the springs keep the points of the wickers or teeth from rubbing on the wall of the casing as the tool descends. The springs may be of any suitable form. In the present instance in the "inside" tool, each spring is in the form of a bow 28ᵇ of light spring metal, one end of which is fastened to the slip by a screw 28ᶜ. The slip may be provided with a longitudinal groove 28ᵈ to receive the spring.

In the "outside" type of tool shown in Figure 1, each spring is in the form of a bow 9ᶜ, and is attached at one end by a screw 9ᵈ. This spring is received in a groove 9ᵉ formed circumferentially on the outer face of each slip.

In order to facilitate the assembling of the parts of the "inside" tool, we prefer to construct the head 24 of two pieces including a body 24ª and a collar 24ᵇ. The collar 24ᵇ has the grooves 26 already referred to, which retain the lower ends of the slips 22. This collar is held fixed against rotation on the mandrel by means of a dowel pin 24ᶜ and the collar seats upon an annular shoulder 24ᵈ near the lower end of the mandrel.

It will be evident that with the "inside" tool or the "outside" tool, the slips can be readily disengaged by giving the tool a backward rotation. Where the "inside" tool is used for backing off a casing or drill-string having the usual right hand thread at its joints, of course, the joints in the tool string carrying the fishing-tool would have left hand thread.

It is understood that the embodiment of the invention described herein is only one of the many embodiments this invention may take, and we do not wish to be limited in the practice of the invention, nor in the claims, to the particular embodiment set forth.

We claim:

1. A fishing tool for fishing "lost" objects out of a well, having an elongated retaining member for carrying slips, said retaining member having curved faces eccentric to its longitudinal axis and slips of arcuate form carried by the retaining member, having curved faces on one side to cooperate with the curved faces of the retaining member, and having a plurality of teeth on their opposite sides extending longitudinally of the fishing tool, said teeth operating upon a sudden rotation of the retaining member on its longitudinal axis to hold the slips relatively fixed, thereby enabling the eccentric curved faces of the tool to move the slips against the "lost" part, said slips further having circumferentially disposed teeth for gripping the "lost part" to facilitate raising the same out of the well.

2. In a fishing tool for fishing "lost" objects out of a well, the combination of a body, a head at each end of the body including a detachable head having a thread connection with the body, a plurality of slips carried by the body between the heads and retained by the said heads, said body having a plurality of curved eccentric faces eccentric to its longitudinal axis, said slips being of tapered form in a circumferential direction, having curved faces on one side corresponding to the said eccentric faces, and having teeth on their other sides, said retaining member and said slips cooperating upon the sudden rotation of the retaining member on its longitudinal axis to move the slips to grip the "lost" object.

3. A fishing tool for recovering "lost" objects from a well, having an elongated retaining member for carrying slips, said retaining member having curved eccentric faces eccentric to its longitudinal axis, slips of arcuate form carried by the retaining member, having curved faces on one side to cooperate with the curved faces of the retaining member, and having teeth on their opposite sides, said retaining member and said slips cooperating upon a sudden rotation of the retaining member on its longitudinal axis to move the slips to grip the "lost" object, and springs associated with said slips.

4. In a fishing tool for use in deep wells, the combination of an upper head having means at its upper end for attaching the same to a tool string, a lower head in the form of a shoe, adapted to be thrust over the "fish", a tubular body connecting said heads, said body having a pair of oppositely disposed curved faces disposed eccentrically to the longitudinal axis of the tubular body, an arcuate slip corresponding to each of said curved faces, having a smooth face on its outer side and having teeth on its inner side for grasping the "fish", said slips being of tapered form and having the teeth projecting toward the thicker edge of the slip, whereby a rotation of the body relative to the slips will force the same inwardly to grasp the "fish".

5. In a fishing tool for use in deep wells, the combination of an upper head having means for securing the same to the lower end of a drill string, a tubular body secured to the head, a shoe secured to the lower end of the tubular body and mounted so that its upper end forms a retaining shoulder within the body, said shoe constructed with a bore enabling the same to be passed over the "fish", said body having a pair of oppositely disposed curved faces eccentric to the longitudinal axis of the body, so that two diametrically opposite shoulders are formed in the body, extending longitudinally of the same, a tapered arcuate slip corresponding to each of said curved faces, with its butt end adapted to rest against a corresponding one of the said longitudinal shoulders, each slip having teeth on its inner face projecting towards its butt, said slips being supported at their lower ends on said retaining shoulder, said body and said slips cooperating so that when the body is relatively rotated on its axis, the slips will be forced in to grasp the "fish".

Signed at Los Angeles this 20th day of April, 1927.

IDRIS THOMAS.
ERNEST I. TIBBET.